United States Patent [19]

Norman

[11] 4,413,538
[45] Nov. 8, 1983

[54] UNIVERSAL SERVICE TOOL

[75] Inventor: Robert D. Norman, Bramalea, Canada

[73] Assignee: Spar Aerospace Limited, Toronto, Canada

[21] Appl. No.: 244,670

[22] Filed: Mar. 17, 1981

[51] Int. Cl.³ .............................................. B25B 17/00
[52] U.S. Cl. .................................. 81/57.13; 81/57.24; 81/57.4
[58] Field of Search ................. 81/57.11, 57.12, 57.13, 81/57.14, 57.24, 57.35, 57.4, 55, 56; 173/32, 33; 408/79, 117, 239, 240; 409/230, 234, 231, 232; 29/33 P

[56] References Cited

U.S. PATENT DOCUMENTS

| 1,020,964 | 3/1912 | Caswell | 81/57 |
| 1,762,796 | 6/1930 | Ridenour | 29/262 |
| 1,804,843 | 5/1931 | Santiago | 29/262 |
| 2,098,134 | 11/1937 | Cook et al. | 29/265 |
| 3,007,686 | 11/1961 | Pearson | 173/33 |
| 3,175,388 | 3/1965 | Ford et al. | 81/55 |
| 3,491,837 | 1/1970 | Seecombe et al. | 81/56 |

FOREIGN PATENT DOCUMENTS

| 765949 | 4/1954 | Fed. Rep. of Germany | 173/33 |
| 566541 | 11/1923 | France | 173/33 |

Primary Examiner—James L. Jones, Jr.
Attorney, Agent, or Firm—Fetherstonhaugh & Co.

[57] ABSTRACT

A latch mechanism and a self-supporting tool incorporating the latch mechanism are disclosed herein. The tool comprises a housing, a power transmission, a powered shaft and workpiece engaging means. The workpiece engaging means is secured to the housing and adapted to engage the workpiece in use such that the workpiece may be restrained against longitudinal and rotational movement with respect to the housing when worked by operation of the powered shaft. The latching system comprises a latch support on the housing which has a latching shoulder which projects laterally at one end thereof. A latch head is disposed outwardly from the shoulder and latching means is mounted on the head for movement between a retracted configuration in line with the head and an extended position projecting laterally from the head to overlie the shoulder and clamp a workpiece therebetween. The latch is activated by an actuator which is operable to effect movement of the latch between the extended and retracted positions in use.

12 Claims, 9 Drawing Figures

UNIVERSAL SERVICE TOOL

This invention relates to a latch mechanism which is adapted to be releasably secured to a workpiece and a self-supporting tool which incorporates a latch mechanism for securing the tool with respect to a workpiece.

In particular, this invention relates to a universal service tool suitable for use in module interchange systems, such as those required for servicing satellites in orbit.

In the servicing of a satellite in orbit it is necessary to secure modular compartment to a servicing arm for the purpose of transporting them from one site to another. The tool required for this purpose must be capable of being releasably latched to the modules. Difficulty has been experienced in providing a simple and efficient latching mechanism in such a tool.

PRIOR ART

Difficulty have also been experienced in attempting to perform relatively simple operations in which a torque load is applied to an object because the object is not anchored in a manner which will resist the torque load.

These difficulties have been overcome by the tool described hereinafter by providing a latching mechanism which interlocks the tool in the workpiece to prevent relative movement therebetween.

In environments where it is difficult to service a tool, it is important to ensure that any electrically powered function may also be mechanically performed in the event of failure of the electrical system. This is achieved in the present tool by providing a manually operable mechanism which may be employed to move the latching mechanism between the latching and unlatching configurations and by providing a manually operable mechanism which may be used to drive the powered drive shaft.

SUMMARY OF THE INVENTION

It is an object of the present invention to provide a tool which is adapted to be secured with respect to a workpiece in a manner to prevent relative movement between the tool and the workpiece.

It is an object of the present invention to provide a tool which is adapted to be secured with respect to a workpiece in a manner to prevent relative movement between the tool and the workpiece during the application of a work load by a work shaft carried by the tool to a component carried by the workpiece.

It is a further object of the present invention to provide a simple and efficient latching mechanism for securing a tool or the like to a workpiece or the like.

According to one aspect of the present invention, a self-supporting tool comprises a housing, a power source mounted on said housing, a powered shaft supported by said housing to extend therefrom along the first axis, said shaft being operably connected to said power source to be driven by it in use, a workpiece engaging means mounted on said housing laterally outwardly from said shaft, said workpiece engaging means being secured to said housing to prevent rotation about said powered shaft and adapted to engage a workpiece in use such that the workpiece may be restrained against longitudinal and rotational movement with respect to said housing when worked by operation of the powered shaft.

According to a further aspect of the present invention, a latch assembly comprises a latch support means, a latching shoulder projecting laterally at a first end of said support means, a latch actuator rod having a first end and a second end, said actuator rod being slidably mounted in said support means to reciprocate longitudinally between an extended position and a retracted position, said first end projecting outwardly from said shoulder, a latching head mounted at said first end of said actuator rod, a pair of latch arms each having an upper arm portion and a forearm portion, the proximal end of each upper arm portion being pivotally connected at the inner end of the head, one at each side thereof, the distal end of each upper arm portion being pivotally connected to the proximal end of the forearm portion and the distal end of each forearm being pivotally mounted on a retaining collar adapted to retain the distal ends of the forearm portion adjacent the latch actuator rod, said latch arms articulating in response to movement of said head such that when said head is in said extended position, the arms are extended and arranged in line with the head and when the head is in the retracted position, the arms are bent such that the forearm portions project laterally to overlie said shoulders to clamp a workpiece therebetween in use, latch drive means operable to drive said actuator rod relative to said support means between said extended position and said retracted position.

The invention will be more clearly understood after reference to the following detailed specification provided in conjunction with the drawings wherein.

Figures 1, 2:
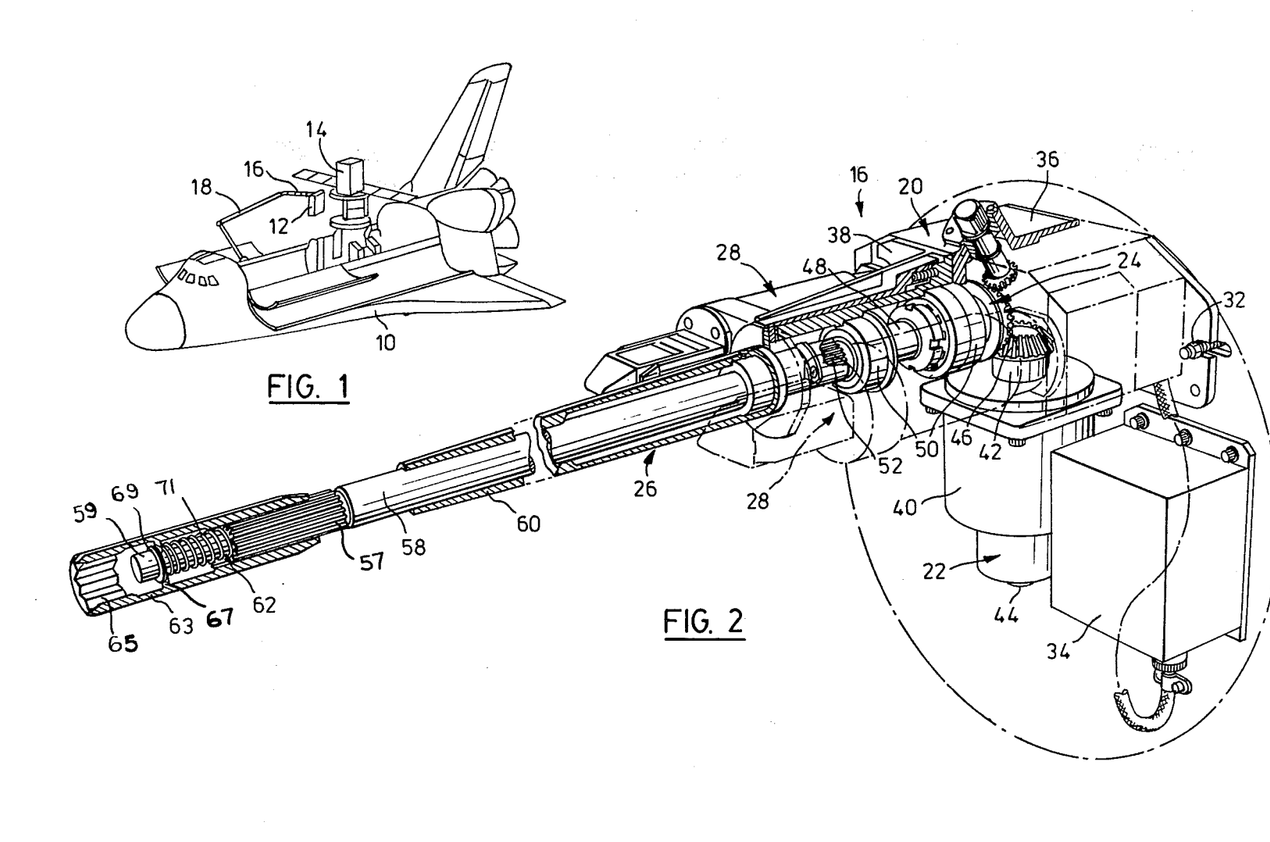
FIG. 1 is a pictorial illustration of a space shuttle showing a module interchange system in operation.
FIG. 2 is a partially sectioned isometric view of a tool constructed in accordance with an embodiment of the present invention.

With reference to FIG. 1 of the drawings, reference numeral 10 refers generally to a shuttle craft in which a module 12 of a satellite 14 is being replaced by operation of a tool 16 mounted on the remote manipulator arm 18 of the shuttle craft.

The structure of the tool 16 is more clearly illustrated with reference to FIG. 2 of the drawings in which the reference numeral 20 refers generally to a housing which supports a power source 22 and in which the power transmission mechanism 24 is mounted. A powered shaft assembly is generally identified by the reference numeral 26 and a pair of latch assemblies are each identified by the reference numeral 28.

Figure 9:
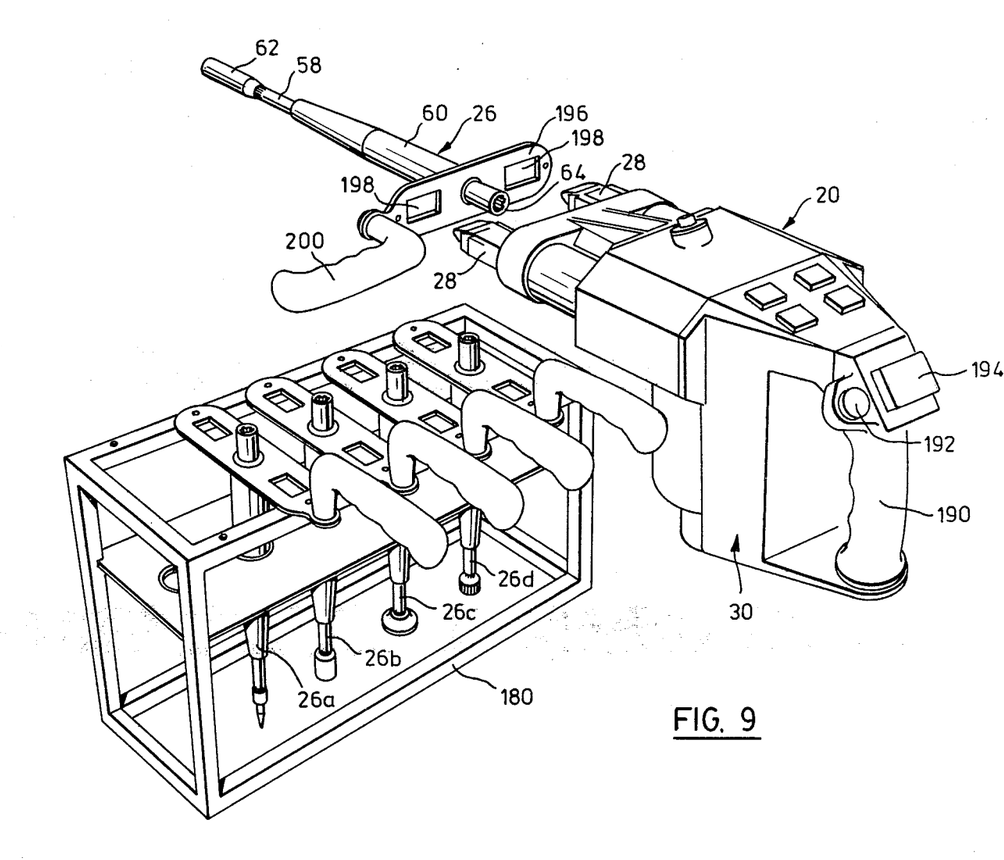
FIG. 9 is a pictorial view of a manually operable tool constructed in accordance with an embodiment of the present invention in combination with a rack supporting a plurality of powered shaft assemblies selectively connectible to the workhead of the tool.

The housing 20 may be mounted as shown in FIG. 1 at an interface with the remote manipulator arms 16 or it may interface with a manually engageable unit 30 (FIG. 9). In either case, a pair of mounting screws and locking nuts generally identified by the reference numeral 32 may be used for securing the housing 20 to the remote manipulator arm 16 or the manually engageable unit 30. An electronics pack 34 is provided for use in connecting the controls to the various drive units whereby the drive units may be remotely controlled.

Figure 8:
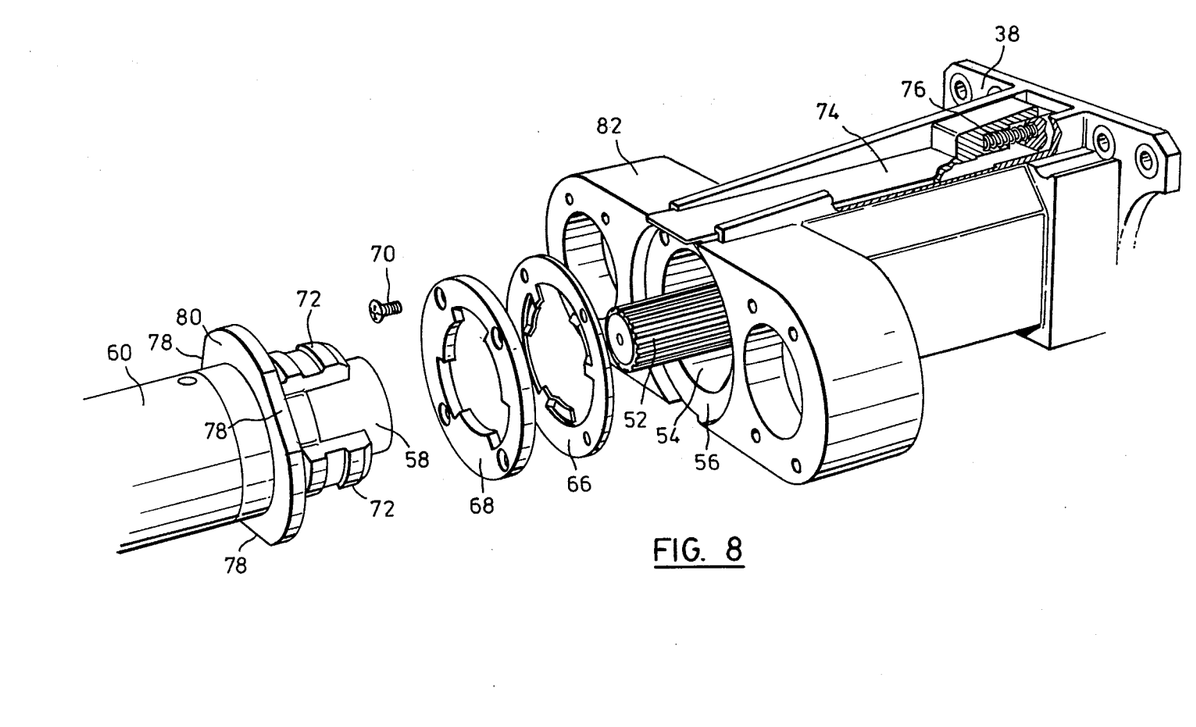
FIG. 8 is a partially sectioned exploded pictorial view illustrating the manner in which the driven shaft assembly is releasably connected to the housing tool.

The housing 20 comprises a base 36 and a shaft support 38. The main power source 22 comprises an electric motor and gear reduction assembly 40 which is secured to the base 36 of the housing with the inner end 42 of its drive shaft projecting into the housing and the outer end 44 of its drive shaft exposed at the other end of the motor. A bevelled gear 46 is mounted at the inner end of the drive shaft 42. The inner end 42 of the motor shaft forms the input drive shaft of the power transmission assembly 24. The powered transmission shaft 48 forms the power output shaft of the power transmission means and is mounted for rotation in the shaft support 38 by means of a plurality of bearings 50. The output end 52 of the transmission shaft 48 is splined and projects through an opening 54 formed in the outer end of the shaft support 38 (FIG. 8). As shown in FIG. 8 of the drawings, recess 56 is formed in the outer end of the shaft support 38 concentric with the output end 42 of the power transmission shaft.

The powered shaft assembly 26 comprises a shaft 58, a sleeve 60 and socket 63. The inner end of the shaft 60 is formed with a splined passage 64 (FIG. 9) adapted to receive the output end 52 of the transmission shaft. The outer end of the shaft 58 is formed with splined portion 57 and an end portion 59 of reduced diameter. The inner end of the socket 63 is splined to slidably receive the splined portion 57 and the outer end of the socket 63 is formed to provide a nut engaging socket portion 65. A collar 67 is formed within the socket 62 and the end portion 59 projects through the collar 67 and has a locking ring 69 mounted thereon. A compression spring 71 extends between the collar 67 and the shoulder formed at the inner end of portion 57. The spring 71 normally urges the socket 63 to the extended position shown in FIG. 2.

A bayonet-type connection is formed between the sleeve 60 and the shaft support 38. The bayonet connection includes a bayonet lock plate 66 and a bayonet retaining plate 68 which fits within the recess 56 and is retained by mounting screws 70. Bayonet lugs 72 project from the end of the collar 80 and are adapted to pass into the passages formed in the bayonet lock plate and bayonet retaining plate and to be retained therein in use by rotation in a conventional bayonet-type mounting action. A slide 74 is mounted on the shaft support 38 so that its outer end is normally urged by a spring 76 to a position projecting forwardly from the support 38 to an extent sufficient to overlie any one of the flats 78 formed in the collar 80 of the sleeve 60, thus, preventing the rotation of the sleeve 60 to permit release of the bayonet connection until the slide 74 is moved to a position withdrawing its outer end from the position overlying the flats 78.

Figure 4:
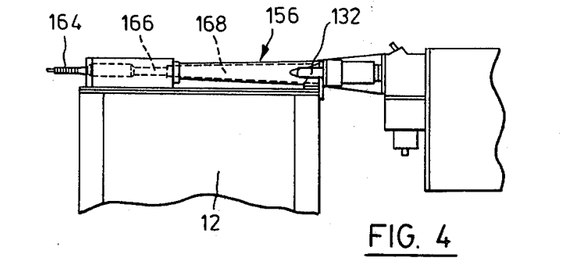
FIG. 4 shows the tool and module latch assembly mated one with the other.
Figure 5:
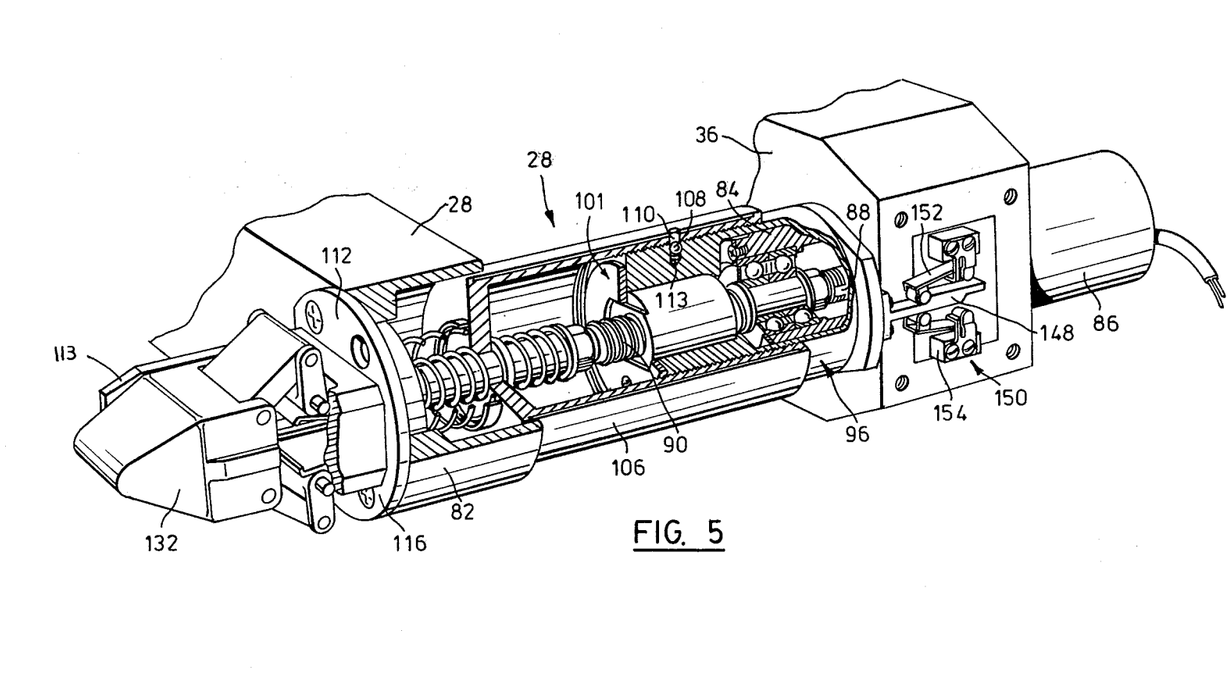
FIG. 5 is a partially sectioned pictorial view of a latch for use in latching the tool to the workpiece.

As previously indicated, a pair of latch assemblies 28 are arranged one on either side of the powered shaft assembly 26. With reference to FIGS. 4 and 5 it will be seen that the latch assemblies are supported at their front end by arms 82 which project laterally from the shaft support 38. The latch assemblies 28 extend rearwardly from the arms 82 to neck portions 84 which project from the base 36. A latch motor and gearhead assembly 86 is supported by the base 36 and has an output shaft 88. A threaded ball screw 90 is connected to the output shaft 88 of the assembly 86 through a coupler 92 which is mounted for rotation in bearings 94, and is retained by a lock nut 93. A carriage assembly is mounted on the ball screw 90. The carriage assembly 96 comprises a ball nut 98 mounted in a retaining housing 100. The ball nut 98 is retained against rotation by a face plate 101 which is secured to the housing 100. The housing 100 has a recess 102 opening inwardly from one end thereof in which a pair of key slots 104 are formed. The slots 104 are adapted to engage ridges 85 formed on the neck portion 84 thus limiting the movement of the retaining housing 100 to axial movement with respect to the ball screw 90. The carriage assembly 96 also includes a manual drive tube 106 which is threadably mounted on the retaining housing 100. The drive tube 106 is normally retained in a set position with respect to the housing 100 by means of locking ball 108 which is resiliently urged by means of a spring 113 into a recess 110 formed in the drive tube 106. The drive tube 106 can be manually rotated relative to the retaining housing 100 by initially applying sufficient force to depress the locking ball with the result that the drive tube 106 can be manually moved longitudinally with respect to the retaining housing 100.

A mounting plate 112 is mounted on the arm 82 and has a neck 114 projecting forwarding therefrom and a shoulder 116 projecting laterally from the neck 114. The neck 114 has side walls 113 projecting forwardly therefrom. A latch shaft 118 is slidably mounted in the mounting plate 112. The latch shaft 118 has a collar 120 projecting radially outwardly therefrom so as to bear against an inner face of mounting plate 112. A lock nut 122 is threadedly mounted at the inner end of the latch shaft 118 to retain a compression spring 124 in a position bearing against a washer 123 an inner face of the drive tube 106. A compression spring 126 bears against the shoulder 120 of the latch shaft 118 and a spring retaining collar 128 located at the outer end of the drive tube 106. A further spring 130 extends between the retainer 128 and an inner face of the mounting plate 112.

A latching head 132 is mounted at the outer end of the shaft 118 and is located between the side walls 113 of the neck 114. A pair of latching arms generally identified by the reference numeral 134 are located one at each side of the shaft 118. The latching arms 134 each include an upper arm portion 136 and a forearm portion 138. The proximal end of the upper arm portion 136 is pivotally mounted by means of a pivot pin 139 to the inner end of the head 132. The distal end of the upper arm portion 136 is pivotally connected by means of a pivot pin 140 to the proximal end of the forearm portion. The distal end of the forearm portion is pivotally mounted by means of a pivot pin 142 to the side walls 113. Springs 143 are mounted on the neck 114 by means of mounting screws 144. The springs 143 normally urge the arms outwardly and prevent inward buckling when the head 132 is retracted in use.

Figure 6:
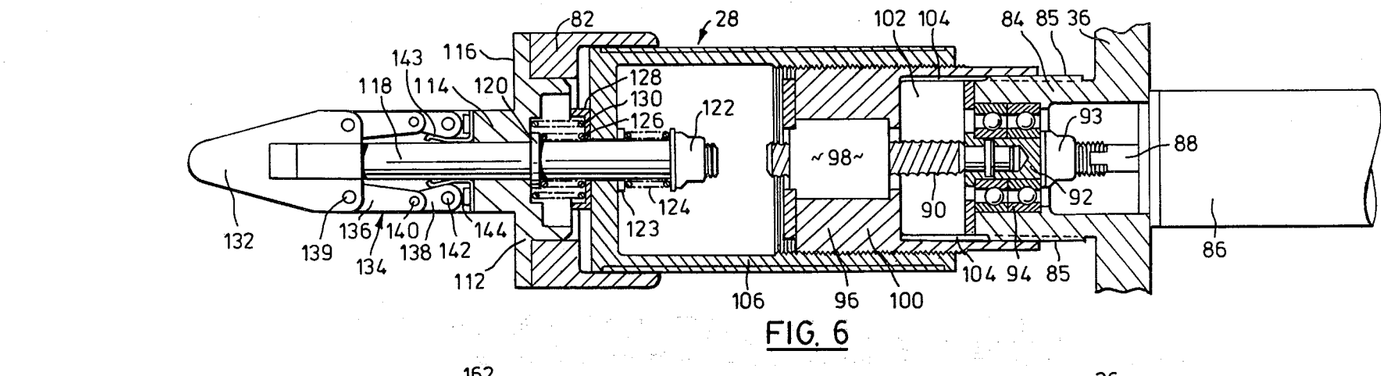
FIG. 6 is a side view of the latch of FIG. 5 with the head arranged in the extended configuration.
Figure 7:
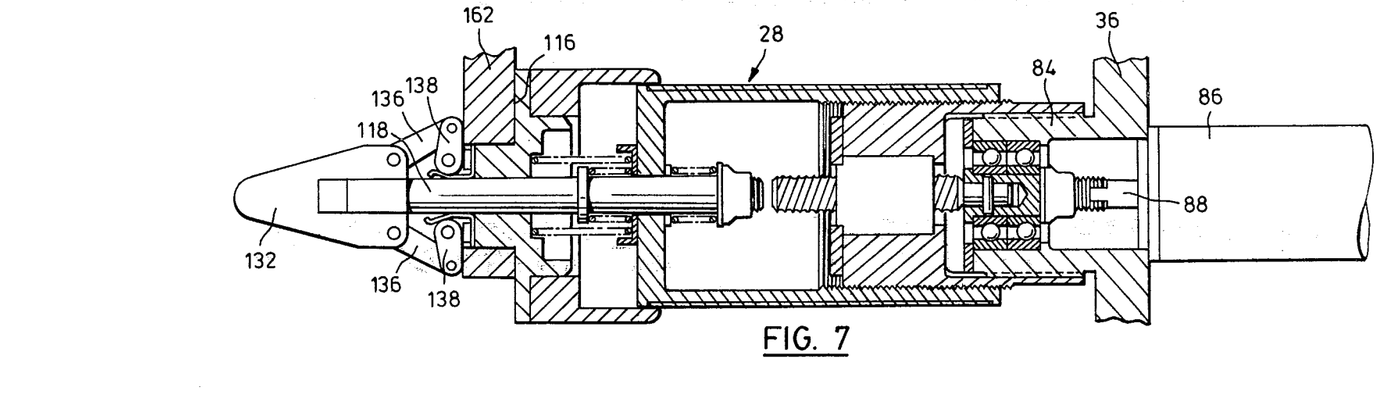
FIG. 7 is a sectional view similar to FIG. 6 showing the latch head in the retracted configuration.

In use, movement of the latch shaft 118 between the extended position shown in FIG. 6 of the drawings and the retracted position shown in FIG. 7 of the drawings results in movement of the head 132 relative to the mounting plate 112 and causes the link arms to articulate from the in line position shown in FIG. 6 to the clamping position shown in FIG. 7 in which the forearm portions 138 project laterally outwardly to overlie the shoulders 116. When the forearms 138 are in the position shown in FIG. 7, they may be used to effectively clamp the latch assemblies to a mounting bracket 162.

Referring to FIG. 5 of the drawings, it will be seen that a limit switch assembly generally identified by the reference numeral 150 is supported by the housing 136 in a position to be operated by an actuator arm 148 which is mounted on the threaded nut assembly 96 for movement therewith. The limit switch assembly 150 includes a limit switch 152 which functions to indicate the limit of the extent of the retracting movement of the head 132 and a limit switch 154 serves to indicate the limit of the extension of the head 132 in co-operation with the limit switch actuator 148.

Figure 3:
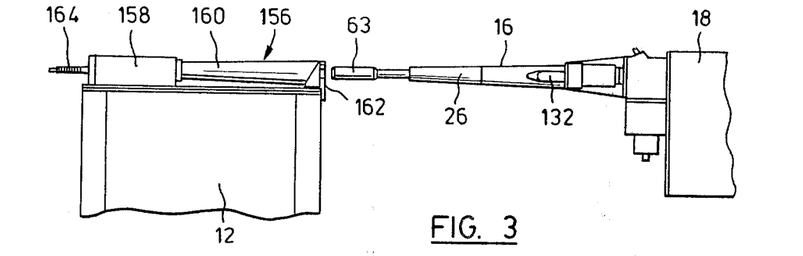
FIG. 3 is a side view illustrating the manner in which the tool is aligned with the module latch assembly prior to the mating of one with the other.
Figure 3A:
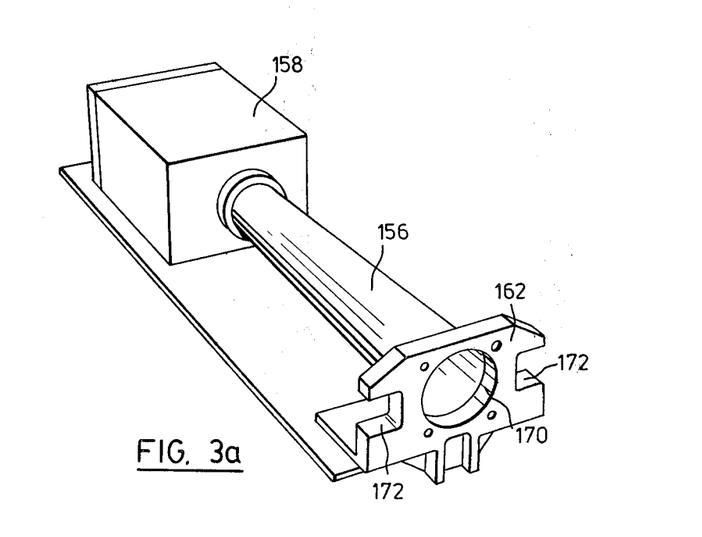
FIG. 3a is an isometric view of a module latch assembly.

The workpiece in association with which the preferred embodiment of the tool described above is illustrated in FIGS. 3, 4 and 5 of the drawings. The workpiece is generally identified by the reference numeral 156. In this embodiment, the workpiece 156 is a module latch mounted on a module 12. The latch includes a latch housing 158, a guide tube 160, mounting bracket 162 and threaded latch bolt 164. The latch housing 158 has a through passage 166 within which the head of the bolt 164 is seated with the threaded stem of the bolt 164 extending outwardly therefrom. The guide tube 160 has a through passage 168 aligned with the through passage 166. The mounting bracket 162 has a through passage 170 aligned with the through passage 168 of the guide tube 160. A pair of notches 172 extend laterally inwardly from the side edges of the mounting bracket 162 one on either side of the through passage 170. The notches 172 are proportioned and arranged to receive the latching heads 132 when the latching heads are in the extended position.

In use, the required powered shaft assembly is selected and operably connected to the housing. With the latching head in the extended postion, the manipulator arm 18 is activated to position the tool 16 in relation to the workpiece 156 such that the powered shaft assembly 26 is aligned with the through passage 170 of the face plate 162 and the latch heads 132 are aligned with the notches 172 of the face plate. The manipulator arm 18 is then activated to cause the powered shaft assembly 26 to enter the passage 170 and to pass through the guide tube 160 to an extent sufficient to position the socket 63 in driving engagement with the head of the latching screw 164. It will be noted that if the socket portion 65 is not aligned with the head of the latching screw 164 it will telescope on the splined portion 57 and compares the spring 71 with the result that when the shaft 118 is subsequently driven the socket will eventually be aligned with the nut (when shaft 58 is rotated) and the spring 71 will drive the socket portion 65 onto the nut. In this position, the shoulder 116 of the latch assembly 28 bears against the front face of the face plate 162. The latch motor 86 is, then, activated to move the latch head to the retracted position causing the latch arms to assume the position shown in FIG. 7 of the drawings in which the face plate 162 is clamped between the forearm portions 138 and the shoulder 116, thereby, locking the tool to the face plate and, therefore, the workpiece, to prevent movement of the tool housing relative to the workpiece. The power source 22 may, then, be activated to rotatably drive the powered shaft 58 so that the socket will apply a torque to the head of the latching bolt 164 to cause it to rotate to engage or release a supporting structure. After the work has been completed, the tool 16 may be disconnected from the workpiece and the powered shaft assembly may be disconnected from the housing by reversing the procedures described above.

The powered shaft assemblies 26 are normally stored in a storage rack, such as the rack illustrated in FIG. 9 and identified by the reference numeral 180.

FIG. 9 of the drawings illustrates a further embodiment of the present invention in which, the housing 20 is supported by a manually engageable unit 30 which has a grip handle 190 with various control buttons 192, 194 being provided for controlling the operation of the powered drive shaft and latching mechanisms. In addition, in the embodiments illustrated in FIG. 9, the sleeve 60 of the powered shaft assembly 26 has a face plate 196 mounted thereon which extends outwardly therefrom and in which latch passages 198 are formed. The latch arms 28 are arranged to extend through the passages 198. A handle 200 is connected to the face plate 196 to provide handleability during service. As shown in FIG. 9, a plurality of powered shaft assemblies 26a, 26b, 26c, 26d are provided each having a workhead of a different character for different applications. Some of the heads of the work tools may be in the form of grinding wheels, cutting wheels or the like.

Various modifications of the apparatus of the present invention will be apparent to those skilled in the art. For example, the powered transmission system may be modified to impart a reciprocating or hammer load to the powered shaft.

From the foregoing, it will be apparent that the tool of the present invention is readily adapted to be secured with respect to a workpiece in a manner so that loads can be applied by the tool to the workpiece while the workpiece is held rigidly with respect to the tool.

The latching mechanism described herein provides a simple and reliable structure which permits the securing of two mechanism one to the other. It will be apparent that the latching assembly alone provides a mechanism which is well suited for use in transporting items from one location to another.

What I claim as my invention is:

1. A tool comprising:
   (a) a housing;
   (b) power transmission means mounted on said housing for connection with a power source;
   (c) a powered shaft supported by said housing to extend therefrom along a first axis, said shaft being operably connected to said power transmission means to be driven through it in use;
   (d) workpiece engaging means mounted on said housing laterally outwardly from said shaft, said workpiece engaging means being secured to said housing to prevent rotation about said powered shaft and adapted to engage a workpiece in use such that the workpiece may be restrained against longitudinal and rotational movement with respect to said housing when worked by operation of the powered shaft;
   (e) said workpiece engaging means comprising a pair of latch assemblies projecting from said housing, one on either side of said powered shaft to engage a workpiece at opposite sides of said powered shaft;
   (f) each of said latch assemblies comprising:
      (i) latch support means on said housing, (ii) a latching shoulder projecting laterally at first end of said support means, (iii) a latch actuator rod having a first end and a second end, said latch actuator rod being slightably mounted in said support means to reciprocate longitudinally between an extended position and the retracted position, said first end of said actuator rod projecting forwardly from said first end of said support means, (iv) a latching head mounted at said first end of said actuator rod, said latching head having an inner end disposed toward said shoulder, (v) a pair of latch arms each having an upper arm portion and a forearm portion, the proximal end of each upper arm portion being pivotally connected to the inner end of the head, one at each side thereof, the distal end of each upper arm portion being pivotally connected to the proximal end of the forearm portion, the distal end of each forearm portion being pivotally mounted on the housing adjacent the latch actuator rod, said arms articulating in response to movement of said head such that when said head is in said extended position, the arms are extended and arranged in-line with the head and when the head is in the retracted position, the arms are bent such that the forearm portions project laterally to overlie said shoulders to clamp a workpiece therebetween, (vi) latch drive means operable to drive said actuator rod relative to said support means between said extended position and said retracted position to move said head to effect movement of said link arms as aforesaid.

2. A tool as claimed in claim 1 wherein said latch drive means comprises:

(a) a latch drive motor mounted on said latch support means;

(b) a threaded drive shaft drivingly connected to said latch drive motor to be rotatably driven thereby in use;

(c) a carriage having a threaded passage within which said threaded drive shaft is mounted for rotation, said carriage being adapted to co-operate with said latch support means to provide rotation of the carriage in response to rotation of the said shaft such that the carriage is driven longitudinally of the support means in response to rotation of the threaded shaft;

(d) said second end of said latch actuator rod being mounted in said carriage whereby said actuator rod may be driven by said carriage between said extended position and retracted position in response to operation of said latch drive motor.

3. A tool as claimed in claim 2 including spring means yieldably engaging said actuator shaft and said carriage whereby the actuator shaft is permitted to slide longitudinally relative to said carriage to a sufficient extent to override the movement of the carriage with respect to the latch mechanism when said fore arm portion is in said overlying position.

4. A tool as claimed in claim 2 wherein said carriage has an exposed outer face which is manually engageable to effect rotation of said carriage about said threaded drive shaft whereby said latch actuator rod may be manually driven between said extended and retracted position to move said latching head between said extended and said retracted positions in use.

5. In a module interchange system for an orbit interchange of modules or a satellite or the like in which a module is releasably secured to a support structure of a module exchange magazine or a support structure of a satellite by means of a module latch system which is releasable by a release tool the improvement wherein the module latch system comprises:

(a) a module latch housing mounted on said module, said housing having a front end and a back end a through passage opening longitudinally therethrough;

(b) a mounting bolt having a head portion and a threaded shaft, said mounting bolt being located in said passage with said threaded shank projecting outwardly from the back end thereof and the head retained therein against movement longitudinally of said through passage;

(c) an interface bracket at the front end of said mounting latch housing, said interface bracket having a pair of notches arranged one on either side and extending inwardly toward said through passage, and wherein the protable release tool comprises:

(i) a housing;

(ii) a power source mounted on said housing;

(iii) a powered shaft supported by said housing to extend therefrom along a first axis, said powered shaft being mounted for rotation about said first axis and having one end in driving engagement with said power source and a socket at the other end thereof adapted to engage the head portion of said mounting bolt of said module latch system;

(d) a pair of latch supports on said housing arranged one on either side of said powered shaft, each latch support having a latching shoulder;

(e) a latch actuator rod having a first end and a second end, said actuator rod being slidably mounted in said support means to reciprocate longitudinally between an extended position and a retracted position, said first end projecting outwardly from said shoulder;

(f) a latching head mounted at said first end of said actuator rod;

(g) a pair of latch arms each having an upper arm portion and a forearm portion, the proximal end of each arm portion being pivotally connected at the inner end of the head one at each side thereof, the distal end of each arm portion being pivotally connected to the proximal end of a forearm portion and the distal end of each forearm being pivotally mounted on said latching head adapted to retain the distal ends of the forearm portions adjacent the latch actuator rod, said arms articulating in response to movement of said head such that when said head is in said extended position, the arms are extended and arranged in line with said head and when said head is in the retracted position, the arms are bent such that the forearm portions project laterally to overlie said shoulder, said latch heads and their associated latch arms being arranged to extend one through each latching notch of said interface bracket when said powered shaft is positioned with its socket engaging the head of said mounting bolt and (h) latch drive means operable to drive said actuator rod relative to said latch support means between the extended position and the retracted position to effect movement of the latching arms to clamp the interface bracket between the forearm portions and the shoulder whereby the housing of the release tool is interlocked with the module latch housing prior to the application of a torque load through the powered shaft to the mounting bolt.

6. A latch assembly comprising:

(a) a latch support means;

(b) a latching shoulder projecting laterally at a first end of said support means;

(c) a latch actuator rod having a first end and a second end, said actuator rod being slidably mounted in said support means to reciprocate longitudinally between an extended position and a retracted position, said first end projecting outwardly from said shoulder;

(d) a latching head mounted at said first end of said actuator rod;

(e) a pair of latch arms each having an upper arm portion and a forearm portion, the proximal end of each upper arm portion being pivotally connected at the inner end of the head, one at each side thereof, the distal end of each upper arm portion being pivotally connected to the proximal end of the forearm portion and the distal end of each forearm being pivotally mounted on said latching head, said latch arms articulating in response to movement of said head such that when said head is in said extended position, the arms are extended and arranged in line with the head and when the head is in the retracted position, the arms are bent such that the forearm portions project laterally to overlie said shoulders to clamp a workpiece therebetween in use;

(f) latch drive means operable to drive said actuator rod relative to said support means between said extended position and said retracted position.

7. A latch assembly as claimed in claim 6 wherein said latch drive means comprises:

(i) a latch drive motor mounted on said latch support means:

(ii) a threaded drive shaft drivingly connected to said motor to be rotatably driven thereby in use;

(iii) a carriage having a threaded passage within which said threaded drive shaft is mounted for rotation, said carriage being adapted to co-operate with said support means to prevent rotation thereof such that, in response to rotation of said shaft, the carriage is driven longitudinally of the latch support means;

(iv) said second end of said actuator rod being mounted in said carriage whereby said actuator rod may be driven by said carriage between said extended and retracted positions in response to operation of said drive motor.

8. A tool comprising:
(a) a housing;
(b) power transmission means mounted on said housing for connection with a power source;
(c) a powered shaft supported by said housing to extend therefrom along a first axis, said shaft being operably connected to said power transmission means to be driven through it in use;
(d) workpiece engaging means mounted on said housing laterally outwardly from said shaft, said workpiece engaging means being secured to said housing to prevent rotation about said powered shaft and adapted to engage a workpiece in use such that the workpiece may be restrained against longitudinal and rotational movement with respect to said housing when worked by operation of the powered shaft;
(e) said workpiece engaging means comprising:
(i) latch support means on said housing;
(ii) a latching shoulder projecting laterally at one end of said support means;
(iii) a latch head disposed outwardly from said shoulder;
(iv) latch means mounted on said head for movement between a retracted configuration, in-line with said head and in an extended position projecting laterally from said head to overlie said shoulder and clamp a workpiece therebetween in use;
(v) latch actuator means mounted in said latch support means and supporting said head outwardly from said shoulder, said actuator means being operable to effect movement of said latch means between said extended and retracted position in use.

9. A tool comprising:
(a) a housing;
(b) power transmission means mounted on said housing for connection with a power source;
(c) a powered shaft supported by said housing to extend therefrom along a first axis; said shaft being operably connected to said power transmission means to be driven through it in use;
(d) workpiece engaging means mounted on said housing laterally outwardly from said shaft, said workpiece engaging means being secured to said housing to prevent rotation about said powered shaft and adapted to engage a workpiece in use such that the workpiece may be restrained against longitudinal and rotational movement with respect to said housing when worked by operation of the powered shaft;
(e) said workpiece engaging means comprising a pair of latch assemblies projecting from said housing, one on either side of said powered shaft to engage a workpiece at opposite sides of said powered shaft;
(f) each of said latch assemblies comprising:
(i) latch support means on said housing;
(ii) a latching shoulder projecting laterally at one end of said support means;
(iii) a latching head exposed outwardly from said shoulder;
(iv) latch means mounted on said head for movement between a retracted configuration in-line with said head and an extended position projecting laterally from said head to overlie said shoulder and clamp a workpiece therebetween in use;
(v) latch actuator means mounted in said latch support means and supporting said head outwardly from said shoulder, said actuator means being operable to effect movement of said latch means between said extended and rejected positions in use.

10. A tool comprising:
(a) a housing;
(b) power transmission means mounted on said housing for connection with a power source;
(c) a work shaft supported by said housing to extend therefrom along a first axis, said work shaft being operably connected to said power transmission means to be powered by it in use;
(d) workpiece engaging means mounted on said housing laterally outwardly from said work shaft, said workpiece engaging means being secured to said housing to prevent rotation about said work shaft and adapted to engage a workpiece in use such that the workpiece may be restrained against longitudinal and rotational movement with respect to said housing when worked by operation of the work shaft;
(e) said power source comprising a power transmission system and a motor for driving said power transmission system, said power transmission system being mounted in said housing and having a power input shaft and a power output shaft, said motor being mounted on said housing and having a motor shaft, one end of which drivingly engages said input shaft of said power transmission system, said power output shaft being adapted to releasably engage said work shaft to rotatably drive it in use, and gear means connecting said power input shaft and said power output shaft of said transmission system and a mechanical drive shaft mounted in said housing, said mechanical drive shaft having a mechanical drive gear meshed with said gear means whereby rotation of said mechanical drive shaft effects operation of said work shaft.

11. A tool comprising:
(a) a housing;
(b) an output drive shaft drivingly mounted in said housing and having a first free end;
(c) a pair of latch assemblies projecting from said housing, one on either side of said output drive shaft;
(d) a work shaft assembly comprising a support member and a work shaft rotatably mounted in said support member, the work shaft being adapted to be releasably connected to said output drive shaft, said support member being formed with a pair of latch openings each adapted to receive a latch assembly of said housing to releasably secure the support member against rotation with respect to the housing and to releasably retain said work shaft in driving engagment with said output drive shaft.

12. A latch assembly comprising:
(a) latch support means;
(b) a latching shoulder projecting laterally at one end of said support means;
(c) a latch actuator rod having a first end and a second end, said latch actuator rod being slightably mounted in said support means to reciprocate longitudinally between an extended position and the retracted position, said first end of said actuator rod projecting forwardly from said first end of said support means,
(d) a latching head mounted at said first end of said actuator rod, said latching head having an inner end disposed toward said shoulder,
(e) a pair of latch arms each having an upper arm portion and a forearm portion, the proximal end of each upper arm portion being pivotally connected to the inner end of the head, one at each side thereof, the distal end of each upper arm portion being pivotally connected to the proximal end of the forearm portion, the distal end of each forearm portion being pivotally mounted on the housing adjacent the latch actuator rod, said arms articulating in response to movement of said head such that when said head is in said extended position, the arms are extended and arranged in-line with the head and when the head is in the retracted position, the arms are bent such that the forearm portions project laterally to overlie said shoulders to clamp a workpiece therebetween,
(f) latch drive means operable to drive said actuator rod relative to said support means between said extended position and said retracted position to move said head to effect movement of said link arms as aforesaid.

* * * * *